(12) United States Patent
Kulprathipanja et al.

(10) Patent No.: US 11,028,325 B2
(45) Date of Patent: Jun. 8, 2021

(54) HEAT REMOVAL AND RECOVERY IN BIOMASS PYROLYSIS

(71) Applicants: Ensyn Renewables, Inc., Wilmington, DE (US); Vincenza Myers, Arlington Heights, IL (US)

(72) Inventors: Sathit Kulprathipanja, Schaumburg, IL (US); Paolo Palmas, Des Plaines, IL (US); Daniel N. Myers, Arlington Heights, IL (US)

(73) Assignee: Ensyn Renewables, Inc., Wilmington, DE (US)

( * ) Notice: Subject to any disclaimer, the term of this patent is extended or adjusted under 35 U.S.C. 154(b) by 161 days.

(21) Appl. No.: 15/233,560

(22) Filed: Aug. 10, 2016

(65) Prior Publication Data

US 2016/0348005 A1 Dec. 1, 2016

Related U.S. Application Data

(63) Continuation of application No. 13/031,701, filed on Feb. 22, 2011, now Pat. No. 9,441,887.

(51) Int. Cl.
*C10B 49/10* (2006.01)
*C10B 53/02* (2006.01)
(Continued)

(52) U.S. Cl.
CPC ............... *C10B 39/06* (2013.01); *C10G 1/02* (2013.01); *C10G 3/40* (2013.01); *C10G 3/42* (2013.01);
(Continued)

(58) Field of Classification Search
CPC .......... C10B 49/10; C10B 49/22; C10J 3/845; F23C 10/00–32
See application file for complete search history.

(56) References Cited

U.S. PATENT DOCUMENTS 1,252,072 A 1/1918 Abbot
2,205,757 A 6/1940 Wheat
(Continued)

FOREIGN PATENT DOCUMENTS

BR 8304158 7/1984
BR 8304794 4/1985
(Continued)

OTHER PUBLICATIONS

AccessScience Dictionary, "ebullating-bed reactor," http://www.accessscience.com, last visited Jul. 15, 2014.
(Continued)

*Primary Examiner* — Jonathan Luke Pilcher
(74) *Attorney, Agent, or Firm* — Jones Day

(57) ABSTRACT

Pyrolysis methods and apparatuses that allow effective heat removal, for example when necessary to achieve a desired throughput or process a desired type of biomass, are disclosed. According to representative methods, the use of a quench medium (e.g., water), either as a primary or a secondary type of heat removal, allows greater control of process temperatures, particularly in the reheater where char, as a solid byproduct of pyrolysis, is combusted. Quench medium may be distributed to one or more locations within the reheater vessel, such as above and/or within a dense phase bed of fluidized particles of a solid heat carrier (e.g., sand) to better control heat removal.

16 Claims, 2 Drawing Sheets

(51) Int. Cl.
    *C10B 39/06*         (2006.01)
    *F27D 17/00*         (2006.01)
    *C10G 1/02*          (2006.01)
    *C10G 3/00*          (2006.01)
    *F23G 5/027*         (2006.01)
    *F23G 5/30*          (2006.01)
    *F23G 7/10*          (2006.01)
    *F27B 15/02*         (2006.01)

(52) U.S. Cl.
    CPC ................ *C10G 3/50* (2013.01); *C10G 3/60* (2013.01); *F23G 5/0276* (2013.01); *F23G 5/30* (2013.01); *F23G 7/10* (2013.01); *F27B 15/02* (2013.01); *F27D 17/004* (2013.01); *C10B 49/10* (2013.01); *C10B 53/02* (2013.01); *C10G 2300/1011* (2013.01); *C10G 2300/1014* (2013.01); *C10G 2300/202* (2013.01); *C10G 2300/4006* (2013.01); *C10G 2400/20* (2013.01); *F23G 2201/304* (2013.01); *Y02E 50/10* (2013.01); *Y02P 30/20* (2015.11)

(56) References Cited

U.S. PATENT DOCUMENTS

| | | |
|---|---|---|
| 2,318,555 A | 5/1943 | Ruthruff |
| 2,326,525 A | 8/1943 | Diwoky |
| 2,328,202 A | 8/1943 | Doerner |
| 2,380,098 A | 7/1945 | Doerner |
| 2,492,948 A | 1/1950 | Berger |
| 2,566,353 A | 9/1951 | Mills |
| 2,696,979 A | 12/1954 | Berge |
| 2,884,303 A | 4/1959 | William |
| 3,130,007 A | 4/1964 | Breck |
| 3,309,356 A | 3/1967 | Esterer |
| 3,313,726 A | 4/1967 | Campbell et al. |
| 3,444,048 A | 5/1969 | Schmeling et al. |
| 3,445,549 A | 5/1969 | Hakulin |
| 3,467,502 A | 9/1969 | Davis |
| 3,589,313 A | 6/1971 | Smith et al. |
| 3,617,037 A * | 11/1971 | Foch .......... F23G 5/30 34/589 |
| 3,694,346 A | 9/1972 | Blaser et al. |
| 3,696,022 A | 10/1972 | Hutchings |
| 3,760,870 A | 9/1973 | Guetlhuber |
| 3,776,533 A | 12/1973 | Vlnaty |
| 3,814,176 A | 6/1974 | Seth |
| 3,853,498 A | 12/1974 | Bailie |
| 3,876,533 A | 4/1975 | Myers |
| 3,890,111 A | 6/1975 | Knudsen |
| 3,907,661 A | 9/1975 | Gwyn et al. |
| 3,925,024 A | 12/1975 | Hollingsworth et al. |
| 3,927,996 A | 12/1975 | Knudsen et al. |
| 3,959,420 A | 5/1976 | Geddes et al. |
| 4,003,829 A | 1/1977 | Burger et al. |
| 4,021,193 A * | 5/1977 | Waters .......... B01J 8/245 34/585 |
| 4,032,305 A | 6/1977 | Squires |
| 4,039,290 A | 8/1977 | Inada et al. |
| 4,052,265 A | 10/1977 | Kemp |
| 4,064,018 A | 12/1977 | Choi |
| 4,064,043 A | 12/1977 | Kollman |
| 4,085,030 A | 4/1978 | Green et al. |
| 4,101,414 A | 7/1978 | Kim et al. |
| 4,102,773 A | 7/1978 | Green et al. |
| 4,103,902 A | 8/1978 | Steiner et al. |
| 4,138,020 A | 2/1979 | Steiner et al. |
| 4,145,274 A | 3/1979 | Green et al. |
| 4,153,514 A | 5/1979 | Garrett et al. |
| 4,157,245 A | 6/1979 | Mitchell et al. |
| 4,159,682 A | 7/1979 | Fitch |
| 4,165,717 A | 8/1979 | Reh et al. |
| 4,204,915 A | 5/1980 | Kurata et al. |
| 4,210,492 A | 7/1980 | Roberts |
| 4,219,537 A | 8/1980 | Steiner |
| 4,225,415 A | 9/1980 | Mirza et al. |
| 4,233,119 A | 11/1980 | Meyers et al. |
| 4,245,693 A | 1/1981 | Cheng |
| 4,258,005 A | 3/1981 | Ito et al. |
| 4,272,402 A | 6/1981 | Mayes |
| 4,279,207 A | 7/1981 | Wormser |
| 4,280,879 A | 7/1981 | Taciuk |
| 4,284,616 A | 8/1981 | Solbakken et al. |
| 4,298,453 A | 11/1981 | Schoennagel et al. |
| 4,300,009 A | 11/1981 | Haag et al. |
| 4,301,771 A | 11/1981 | Jukkola et al. |
| 4,306,619 A | 12/1981 | Trojani |
| 4,308,411 A | 12/1981 | Frankiewicz |
| 4,311,670 A | 1/1982 | Nieminen et al. |
| 4,312,702 A * | 1/1982 | Tomlinson, II ........ B01J 8/1872 122/7 C |
| 4,317,703 A | 3/1982 | Bowen et al. |
| 4,321,096 A | 3/1982 | Dobbin |
| 4,324,637 A | 4/1982 | Durai-Swamy |
| 4,324,641 A | 4/1982 | Durai-Swamy |
| 4,324,642 A | 4/1982 | Durai-Swamy |
| 4,324,644 A | 4/1982 | Durai-Swamy |
| 4,325,327 A | 4/1982 | Kantesaria et al. |
| 4,334,893 A | 6/1982 | Lang |
| 4,336,128 A | 6/1982 | Tamm |
| 4,341,598 A | 7/1982 | Green |
| 4,344,770 A | 8/1982 | Capener et al. |
| 4,364,796 A | 12/1982 | Ishii et al. |
| 4,373,994 A | 2/1983 | Lee |
| 4,415,434 A | 11/1983 | Hargreaves et al. |
| 4,422,927 A | 12/1983 | Kowalczyk |
| 4,434,726 A | 3/1984 | Jones |
| 4,443,229 A | 4/1984 | Sageman et al. |
| 4,456,504 A | 6/1984 | Spars et al. |
| 4,470,254 A | 9/1984 | Chen et al. |
| 4,482,451 A | 11/1984 | Kemp |
| 4,495,056 A | 1/1985 | Venardos et al. |
| 4,504,379 A | 3/1985 | Stuntz et al. |
| 4,524,752 A | 6/1985 | Beresford |
| 4,537,571 A | 8/1985 | Buxel et al. |
| 4,548,615 A | 10/1985 | Longchamb et al. |
| 4,552,203 A | 11/1985 | Chrysostome et al. |
| 4,574,743 A | 3/1986 | Claus |
| 4,584,064 A | 4/1986 | Ciais et al. |
| 4,584,947 A | 4/1986 | Chittick |
| 4,595,567 A | 6/1986 | Hedrick |
| 4,597,771 A | 7/1986 | Cheng |
| 4,615,870 A | 10/1986 | Armstrong et al. |
| 4,617,693 A | 10/1986 | Meyer et al. |
| 4,645,568 A | 2/1987 | Kurps et al. |
| 4,668,243 A | 5/1987 | Schulz |
| 4,678,860 A | 7/1987 | Kuester |
| 4,684,375 A | 8/1987 | Morin et al. |
| 4,710,357 A | 12/1987 | Cetinkaya et al. |
| 4,714,109 A | 12/1987 | Tsao |
| 4,732,091 A | 3/1988 | Gould |
| 4,796,546 A | 1/1989 | Herstad et al. |
| 4,823,712 A | 4/1989 | Wormer |
| 4,828,581 A | 5/1989 | Feldmann et al. |
| 4,849,091 A | 7/1989 | Cabrera et al. |
| 4,880,473 A | 11/1989 | Scott et al. |
| 4,881,592 A | 11/1989 | Cetinkaya |
| 4,891,459 A | 1/1990 | Knight et al. |
| 4,897,178 A | 1/1990 | Best et al. |
| 4,931,171 A | 6/1990 | Piotter |
| 4,940,007 A | 7/1990 | Hiltunen et al. |
| 4,942,269 A | 7/1990 | Chum et al. |
| 4,968,325 A | 11/1990 | Black et al. |
| 4,983,278 A | 1/1991 | Cha et al. |
| 4,987,178 A | 1/1991 | Shibata et al. |
| 4,988,430 A | 1/1991 | Sechrist et al. |
| 4,992,605 A | 2/1991 | Craig et al. |
| 5,009,770 A | 4/1991 | Miller et al. |
| 5,011,592 A | 4/1991 | Owen et al. |
| 5,016,435 A * | 5/1991 | Brannstrom ............ F02C 3/205 60/39.464 |
| 5,018,458 A | 5/1991 | Mcintyre et al. |
| 5,041,209 A | 8/1991 | Cha et al. |

(56) References Cited

U.S. PATENT DOCUMENTS

| | | |
|---|---|---|
| 5,059,404 A | 10/1991 | Mansour et al. |
| 5,066,627 A | 11/1991 | Owen et al. |
| 5,077,252 A | 12/1991 | Owen et al. |
| 5,093,085 A | 3/1992 | Engstrom et al. |
| 5,136,117 A | 8/1992 | Paisley et al. |
| 5,151,392 A | 9/1992 | Fettis et al. |
| 5,212,129 A | 5/1993 | Lomas |
| 5,225,044 A | 7/1993 | Breu |
| 5,227,566 A | 7/1993 | Cottrell et al. |
| 5,236,688 A | 8/1993 | Watanabe et al. |
| 5,239,946 A | 8/1993 | Garcia-Mallol |
| 5,243,922 A | 9/1993 | Rehmat et al. |
| 5,281,727 A | 1/1994 | Carver et al. |
| 5,306,481 A | 4/1994 | Mansour et al. |
| 5,326,919 A | 7/1994 | Paisley et al. |
| 5,343,939 A | 9/1994 | Cetinkaya |
| 5,365,889 A | 11/1994 | Tang |
| 5,371,212 A | 12/1994 | Moens |
| 5,376,340 A | 12/1994 | Bayer et al. |
| 5,380,916 A | 1/1995 | Rao |
| 5,395,455 A | 3/1995 | Scott et al. |
| 5,402,548 A | 4/1995 | Adair et al. |
| 5,407,674 A | 4/1995 | Gabetta et al. |
| 5,423,891 A | 6/1995 | Taylor |
| 5,426,807 A | 6/1995 | Grimsley et al. |
| 5,478,736 A | 12/1995 | Nair |
| 5,494,653 A | 2/1996 | Paisley |
| 5,520,722 A | 5/1996 | Hershkowitz et al. |
| 5,536,488 A | 7/1996 | Mansour et al. |
| 5,554,347 A | 9/1996 | Busson et al. |
| 5,578,092 A | 11/1996 | Collin |
| 5,584,985 A | 12/1996 | Lomas |
| 5,605,551 A | 2/1997 | Scott et al. |
| 5,637,192 A | 7/1997 | Mansour et al. |
| 5,654,448 A | 8/1997 | Pandey et al. |
| 5,662,050 A | 9/1997 | Angelo, II et al. |
| 5,686,049 A | 11/1997 | Bonifay et al. |
| 5,703,299 A | 12/1997 | Carleton et al. |
| 5,713,977 A | 2/1998 | Kobayashi |
| 5,725,738 A | 3/1998 | Brioni et al. |
| 5,728,271 A | 3/1998 | Piskorz et al. |
| 5,744,333 A | 4/1998 | Cociancich et al. |
| 5,788,784 A | 8/1998 | Koppenhoefer et al. |
| 5,792,340 A | 8/1998 | Freel et al. |
| 5,853,548 A | 12/1998 | Piskorz et al. |
| 5,879,079 A | 3/1999 | Hohmann et al. |
| 5,879,642 A | 3/1999 | Trimble et al. |
| 5,879,650 A | 3/1999 | Kaul et al. |
| 5,904,838 A | 5/1999 | Kalnes et al. |
| 5,915,311 A | 6/1999 | Muller et al. |
| 5,961,786 A | 10/1999 | Freel et al. |
| 5,969,165 A | 10/1999 | Liu |
| 6,002,025 A | 12/1999 | Page et al. |
| 6,011,187 A | 1/2000 | Horizoe et al. |
| 6,033,555 A | 3/2000 | Chen et al. |
| 6,106,702 A | 8/2000 | Sohn et al. |
| 6,113,862 A | 9/2000 | Jorgensen et al. |
| 6,123,833 A | 9/2000 | Sechrist et al. |
| 6,133,499 A | 10/2000 | Horizoe et al. |
| 6,149,765 A | 11/2000 | Mansour et al. |
| 6,190,542 B1 | 2/2001 | Comolli et al. |
| 6,193,837 B1 | 2/2001 | Agblevor et al. |
| 6,237,541 B1 | 5/2001 | Alliston et al. |
| 6,286,443 B1 | 9/2001 | Fujinami et al. |
| 6,339,182 B1 | 1/2002 | Munson et al. |
| 6,497,199 B2 | 1/2002 | Yamada et al. |
| 6,390,185 B1 | 5/2002 | Proeschel |
| 6,398,921 B1 | 6/2002 | Moraski |
| 6,452,024 B1 | 9/2002 | Bui-Khac et al. |
| 6,455,015 B1 | 9/2002 | Kilroy |
| 6,485,841 B1 | 11/2002 | Freel et al. |
| 6,547,957 B1 | 4/2003 | Sudhakar et al. |
| 6,555,649 B2 | 4/2003 | Giroux et al. |
| 6,656,342 B2 | 12/2003 | Smith et al. |
| 6,660,157 B2 | 12/2003 | Que et al. |
| 6,676,828 B1 | 1/2004 | Galiasso et al. |
| 6,680,031 B2 * | 1/2004 | Bisgrove ............ B05B 7/066 |
| | | 118/303 |
| 6,680,137 B2 | 1/2004 | Paisley et al. |
| 6,743,746 B1 | 6/2004 | Prilutsky et al. |
| 6,759,562 B2 | 7/2004 | Gartside et al. |
| 6,768,036 B2 | 7/2004 | Lattner et al. |
| 6,776,607 B2 | 8/2004 | Nahas et al. |
| 6,808,390 B1 | 10/2004 | Fung |
| 6,814,940 B1 | 11/2004 | Hiltunen et al. |
| 6,844,420 B1 | 1/2005 | Freel et al. |
| 6,875,341 B1 | 4/2005 | Bunger et al. |
| 6,960,325 B2 | 11/2005 | Kao et al. |
| 6,962,676 B1 | 11/2005 | Hyppaenen |
| 6,988,453 B2 | 1/2006 | Cole et al. |
| 7,004,999 B2 | 2/2006 | Johnson et al. |
| 7,022,741 B2 | 4/2006 | Jiang et al. |
| 7,026,262 B1 | 4/2006 | Palmas et al. |
| 7,202,389 B1 | 4/2007 | Brem |
| 7,214,252 B1 | 5/2007 | Krumm et al. |
| 7,226,954 B2 | 6/2007 | Tavasoli et al. |
| 7,240,639 B2 | 7/2007 | Hyppaenen et al. |
| 7,247,233 B1 | 7/2007 | Hedrick et al. |
| 7,262,331 B2 | 8/2007 | van de Beld et al. |
| 7,263,934 B2 | 9/2007 | Copeland et al. |
| 7,285,186 B2 | 10/2007 | Tokarz |
| 7,319,168 B2 | 1/2008 | Sanada |
| 7,473,349 B2 | 1/2009 | Keckler et al. |
| 7,476,774 B2 | 1/2009 | Umansky et al. |
| 7,479,217 B2 | 1/2009 | Pinault et al. |
| 7,491,317 B2 | 2/2009 | Meier et al. |
| 7,563,345 B2 | 7/2009 | Tokarz |
| 7,572,362 B2 * | 8/2009 | Freel ................. C10G 9/28 |
| | | 208/126 |
| 7,572,365 B2 | 8/2009 | Freel et al. |
| 7,578,927 B2 | 8/2009 | Marker et al. |
| 7,625,432 B2 | 12/2009 | Gouman et al. |
| 7,811,340 B2 | 10/2010 | Bayle et al. |
| 7,897,124 B2 | 3/2011 | Gunnerman et al. |
| 7,905,990 B2 | 3/2011 | Freel |
| 7,943,014 B2 | 5/2011 | Berruti et al. |
| 7,956,224 B2 | 6/2011 | Elliott et al. |
| 7,960,598 B2 | 6/2011 | Spilker et al. |
| 7,982,075 B2 | 7/2011 | Marker et al. |
| 7,998,315 B2 | 8/2011 | Bridgwater et al. |
| 7,998,455 B2 | 8/2011 | Abbas et al. |
| 7,999,142 B2 | 8/2011 | Kalnes et al. |
| 7,999,143 B2 | 8/2011 | Marker et al. |
| 8,043,391 B2 | 10/2011 | Dinjus et al. |
| 8,057,641 B2 | 11/2011 | Bartek et al. |
| 8,097,090 B2 | 1/2012 | Freel et al. |
| 8,097,216 B2 | 1/2012 | Beech et al. |
| 8,147,766 B2 | 4/2012 | Spilker et al. |
| 8,153,850 B2 | 4/2012 | Hall et al. |
| 8,202,332 B2 | 6/2012 | Agblevor |
| 8,207,385 B2 | 6/2012 | O'Connor et al. |
| 8,217,211 B2 | 7/2012 | Agrawal et al. |
| 8,277,643 B2 | 10/2012 | Huber et al. |
| 8,288,600 B2 | 10/2012 | Bartek et al. |
| 8,304,592 B2 | 11/2012 | Luebke |
| 8,314,275 B2 | 11/2012 | Brandvold |
| 8,329,967 B2 | 12/2012 | Brandvold et al. |
| 8,404,910 B2 | 3/2013 | Kocal et al. |
| 8,499,702 B2 | 8/2013 | Palmas et al. |
| 8,519,203 B2 | 8/2013 | Mahnangeli et al. |
| 8,519,205 B2 | 8/2013 | Frey et al. |
| 8,524,087 B2 | 9/2013 | Frey et al. |
| 8,575,408 B2 | 11/2013 | Marker et al. |
| 8,715,490 B2 | 5/2014 | Brandvold et al. |
| 8,726,443 B2 | 5/2014 | Freel et al. |
| 8,961,743 B2 | 2/2015 | Freel |
| 9,044,727 B2 | 6/2015 | Kulprathipanja et al. |
| 9,441,887 B2 * | 9/2016 | Kulprathipanja ...... F27B 15/02 |
| 2002/0014033 A1 | 2/2002 | Langer et al. |
| 2002/0100711 A1 | 8/2002 | Freel et al. |
| 2002/0146358 A1 | 10/2002 | Smith et al. |
| 2003/0049854 A1 | 3/2003 | Rhodes |
| 2003/0202912 A1 | 10/2003 | Myohanen et al. |
| 2004/0069682 A1 | 4/2004 | Freel et al. |

(56) References Cited

U.S. PATENT DOCUMENTS

| | | |
|---|---|---|
| 2004/0182003 A1 | 9/2004 | Bayle et al. |
| 2004/0200204 A1 | 10/2004 | Dries et al. |
| 2005/0167337 A1 | 8/2005 | Bunger et al. |
| 2005/0209328 A1 | 9/2005 | Allgcod et al. |
| 2006/0010714 A1 | 1/2006 | Carin et al. |
| 2006/0016723 A1 | 1/2006 | Tang et al. |
| 2006/0070362 A1 | 4/2006 | Dewitz et al. |
| 2006/0074254 A1 | 4/2006 | Zhang et al. |
| 2006/0101665 A1 | 5/2006 | Carin et al. |
| 2006/0112639 A1 | 6/2006 | Nick et al. |
| 2006/0130719 A1 | 6/2006 | Morin et al. |
| 2006/0163053 A1 | 7/2006 | Ershag |
| 2006/0180060 A1 | 8/2006 | Crafton et al. |
| 2006/0185245 A1 | 8/2006 | Serio et al. |
| 2006/0201024 A1 | 9/2006 | Carin et al. |
| 2006/0254081 A1 | 11/2006 | Carin et al. |
| 2006/0264684 A1 | 11/2006 | Petri et al. |
| 2007/0000809 A1 | 1/2007 | Lin et al. |
| 2007/0010588 A1 | 1/2007 | Pearson |
| 2007/0141222 A1 | 6/2007 | Binder et al. |
| 2007/0205139 A1 | 9/2007 | Kulprathipanja et al. |
| 2007/0272538 A1 | 11/2007 | Satchell |
| 2008/0006519 A1 | 1/2008 | Badger |
| 2008/0006520 A1 | 1/2008 | Badger |
| 2008/0029437 A1 | 2/2008 | Umansky et al. |
| 2008/0035526 A1 | 2/2008 | Hedrick et al. |
| 2008/0035528 A1 | 2/2008 | Marker |
| 2008/0050792 A1 | 2/2008 | Zmierczak et al. |
| 2008/0051619 A1 | 2/2008 | Kulprathipanja et al. |
| 2008/0081006 A1 | 4/2008 | Myers et al. |
| 2008/0086937 A1 | 4/2008 | Hazlebeck et al. |
| 2008/0161615 A1 | 7/2008 | Chapus et al. |
| 2008/0171649 A1 | 7/2008 | Jan et al. |
| 2008/0185112 A1 | 8/2008 | Argyropoulos |
| 2008/0189979 A1 | 8/2008 | Carin et al. |
| 2008/0193345 A1 | 8/2008 | Lott et al. |
| 2008/0194896 A1 | 8/2008 | Brown et al. |
| 2008/0199821 A1 | 8/2008 | Nyberg et al. |
| 2008/0230440 A1 | 9/2008 | Graham et al. |
| 2008/0236043 A1 | 10/2008 | Dinjus et al. |
| 2008/0264771 A1 | 10/2008 | Dam-Johansen et al. |
| 2008/0274017 A1 | 11/2008 | Boykin et al. |
| 2008/0274022 A1 | 11/2008 | Boykin et al. |
| 2008/0282606 A1 | 11/2008 | Plaza et al. |
| 2008/0312476 A1 | 12/2008 | McCall |
| 2008/0318763 A1 | 12/2008 | Anderson |
| 2009/0008292 A1 | 1/2009 | Keusenkothen et al. |
| 2009/0008296 A1 | 1/2009 | Sappok et al. |
| 2009/0077867 A1 | 3/2009 | Marker et al. |
| 2009/0077868 A1 | 3/2009 | Brady et al. |
| 2009/0078557 A1 | 3/2009 | Tokarz |
| 2009/0078611 A1 | 3/2009 | Marker et al. |
| 2009/0082603 A1 | 3/2009 | Kaines et al. |
| 2009/0082604 A1 | 3/2009 | Agrawal et al. |
| 2009/0084666 A1 | 4/2009 | Agrawal et al. |
| 2009/0090046 A1 | 4/2009 | O'Connor et al. |
| 2009/0090058 A1 | 4/2009 | Dam-Johansen et al. |
| 2009/0113787 A1 | 5/2009 | Elliott et al. |
| 2009/0139851 A1 | 6/2009 | Freel |
| 2009/0165378 A1 | 7/2009 | Agblevor |
| 2009/0183424 A1 | 7/2009 | Gorbell et al. |
| 2009/0188158 A1 | 7/2009 | Morgan |
| 2009/0193709 A1 | 8/2009 | Marker et al. |
| 2009/0208402 A1 | 8/2009 | Rossi |
| 2009/0227823 A1 | 9/2009 | Huber et al. |
| 2009/0242377 A1 | 10/2009 | Honkola et al. |
| 2009/0250376 A1 | 10/2009 | Brandvold et al. |
| 2009/0253947 A1 | 10/2009 | Brandvold et al. |
| 2009/0253948 A1 | 10/2009 | McCall et al. |
| 2009/0255144 A1 | 10/2009 | Gorbell et al. |
| 2009/0259076 A1 | 10/2009 | Simmons et al. |
| 2009/0259082 A1 | 10/2009 | Deluga et al. |
| 2009/0274600 A1 | 11/2009 | Jain et al. |
| 2009/0283442 A1 | 11/2009 | McCall et al. |
| 2009/0287029 A1 | 11/2009 | Anumakonda et al. |
| 2009/0293344 A1 | 12/2009 | O'Brien et al. |
| 2009/0293359 A1 | 12/2009 | Simmons et al. |
| 2009/0294324 A1 | 12/2009 | Brandvold et al. |
| 2009/0301930 A1 | 12/2009 | Brandvold et al. |
| 2009/0308787 A1 | 12/2009 | O'Connor et al. |
| 2009/0318737 A1 | 12/2009 | Luebke |
| 2009/0321311 A1 | 12/2009 | Marker et al. |
| 2010/0043634 A1 | 2/2010 | Shulfer et al. |
| 2010/0083566 A1 | 4/2010 | Fredriksen et al. |
| 2010/0133144 A1 | 6/2010 | Kokayeff et al. |
| 2010/0147743 A1 | 6/2010 | MacArthur et al. |
| 2010/0151550 A1 | 6/2010 | Nunez et al. |
| 2010/0158767 A1 | 6/2010 | Mehlberg et al. |
| 2010/0148122 A1 | 7/2010 | Breton et al. |
| 2010/0162625 A1 | 7/2010 | Mills |
| 2010/0163395 A1 | 7/2010 | Henrich et al. |
| 2010/0222620 A1 | 9/2010 | O'Connor et al. |
| 2010/0266464 A1 | 10/2010 | Sipila et al. |
| 2010/0325954 A1 | 12/2010 | Tiwari et al. |
| 2011/0017443 A1 | 1/2011 | Collins |
| 2011/0067438 A1 | 3/2011 | Bernasconi |
| 2011/0068585 A1 | 3/2011 | Dube et al. |
| 2011/0110849 A1 | 5/2011 | Siemons |
| 2011/0113675 A1 | 5/2011 | Fujiyama et al. |
| 2011/0123407 A1 | 5/2011 | Freel |
| 2011/0132737 A1 | 6/2011 | Jadhav |
| 2011/0139596 A1* | 6/2011 | Bartek .................. C10B 49/22 201/2.5 |
| 2011/0139597 A1 | 6/2011 | Lin |
| 2011/0146135 A1 | 6/2011 | Brandvold |
| 2011/0146140 A1 | 6/2011 | Brandvold et al. |
| 2011/0146141 A1 | 6/2011 | Frey et al. |
| 2011/0146145 A1 | 6/2011 | Brandvold et al. |
| 2011/0160505 A1 | 6/2011 | McCall |
| 2011/0182778 A1 | 7/2011 | Breton et al. |
| 2011/0201854 A1 | 8/2011 | Kocal et al. |
| 2011/0224471 A1 | 9/2011 | Wormsbecher et al. |
| 2011/0239530 A1 | 10/2011 | Marinangeli et al. |
| 2011/0253600 A1 | 10/2011 | Niccum |
| 2011/0258914 A1 | 10/2011 | Banasiak et al. |
| 2011/0278149 A1 | 11/2011 | Hornung et al. |
| 2011/0284359 A1 | 11/2011 | Sechrist et al. |
| 2012/0012039 A1 | 1/2012 | Palmas et al. |
| 2012/0017493 A1 | 1/2012 | Traynor et al. |
| 2012/0022171 A1 | 1/2012 | Frey |
| 2012/0023809 A1 | 2/2012 | Koch et al. |
| 2012/0047794 A1 | 3/2012 | Bartek et al. |
| 2012/0073185 A1 | 3/2012 | Jokela et al. |
| 2012/0137939 A1 | 6/2012 | Kulprathipanja |
| 2012/0160741 A1 | 6/2012 | Gong et al. |
| 2012/0167454 A1 | 7/2012 | Brandvold et al. |
| 2012/0172622 A1 | 7/2012 | Kocal |
| 2012/0193581 A1 | 8/2012 | Goetsch et al. |
| 2012/0205289 A1 | 8/2012 | Joshi |
| 2012/0214113 A1 | 8/2012 | Kulprathipanja et al. |
| 2012/0214114 A1 | 8/2012 | Kim et al. |
| 2012/0216448 A1 | 8/2012 | Ramirez Coredores et al. |
| 2012/0279825 A1 | 11/2012 | Freel et al. |
| 2012/0317871 A1 | 12/2012 | Frey et al. |
| 2013/0029168 A1 | 1/2013 | Trewella et al. |
| 2013/0062184 A1 | 3/2013 | Kulprathipanja et al. |
| 2013/0067803 A1 | 3/2013 | Kalakkunnath et al. |
| 2013/0075072 A1 | 3/2013 | Kulprathipanja et al. |
| 2013/0078581 A1 | 3/2013 | Kulprathipanja et al. |
| 2013/0212930 A1 | 3/2013 | Naae et al. |
| 2013/0105356 A1 | 5/2013 | Dijs et al. |
| 2013/0109765 A1 | 5/2013 | Jiang et al. |
| 2013/0118059 A1 | 5/2013 | Lange et al. |
| 2013/0150637 A1 | 6/2013 | Borremans et al. |
| 2013/0152453 A1 | 6/2013 | Baird et al. |
| 2013/0152454 A1 | 6/2013 | Baird et al. |
| 2013/0152455 A1 | 6/2013 | Baird et al. |
| 2013/0195727 A1 | 8/2013 | Bull et al. |
| 2013/0267743 A1 | 10/2013 | Brandvold et al. |
| 2014/0001026 A1 | 1/2014 | Baird et al. |
| 2014/0140895 A1 | 5/2014 | Davydov et al. |

(56) References Cited

U.S. PATENT DOCUMENTS

| | | |
|---|---|---|
| 2014/0142362 A1 | 5/2014 | Davydov et al. |
| 2014/0230725 A1 | 8/2014 | Holler et al. |

FOREIGN PATENT DOCUMENTS

| | | |
|---|---|---|
| CA | 1312497 | 1/1993 |
| CA | 2091373 | 9/1997 |
| CA | 2299149 | 12/2000 |
| CA | 2521829 | 3/2006 |
| CN | 1377938 | 11/2002 |
| CN | 1730177 | 2/2006 |
| CN | 101045524 | 10/2007 |
| CN | 101238197 | 8/2008 |
| CN | 101294085 | 10/2008 |
| CN | 101318622 | 12/2008 |
| CN | 101353582 | 1/2009 |
| CN | 101365770 | 2/2009 |
| CN | 101381611 | 3/2009 |
| CN | 101544901 | 9/2009 |
| CN | 101550347 | 10/2009 |
| CN | 101745349 | 6/2010 |
| CN | 101993712 | 3/2011 |
| EP | 105980 | 1/1986 |
| EP | 578503 | 1/1994 |
| EP | 676023 | 7/1998 |
| EP | 718392 | 9/1999 |
| EP | 787946 | 6/2000 |
| EP | 1420058 | 5/2004 |
| EP | 2325281 | 5/2011 |
| FI | 117512 | 11/2005 |
| FR | 879606 | 3/1943 |
| GB | 1019133 | 2/1966 |
| GB | 1300966 | 12/1972 |
| JP | 58150793 | 9/1983 |
| JP | 1277196 | 11/1989 |
| JP | 11148625 | 6/1999 |
| JP | 2001/131560 | 5/2001 |
| JP | 2007/229548 | 9/2007 |
| SE | 9903742-6 | 1/2004 |
| WO | 81/01713 | 6/1981 |
| WO | 1991/11499 | 8/1991 |
| WO | 1992/07842 | 5/1992 |
| WO | 1992/18492 | 10/1992 |
| WO | 1994/13827 | 6/1994 |
| WO | 1997/044410 | 11/1997 |
| WO | 2001/009243 | 2/2001 |
| WO | 2001/83645 | 11/2001 |
| WO | 2002/49735 | 6/2002 |
| WO | 2006/071109 | 7/2006 |
| WO | 2007/017005 | 2/2007 |
| WO | 2007/045093 | 4/2007 |
| WO | 2007/050030 | 5/2007 |
| WO | 2007/112570 | 10/2007 |
| WO | 2007/128798 | 11/2007 |
| WO | 2008/009643 | 1/2008 |
| WO | 2008/020167 | 2/2008 |
| WO | 2008/092557 | 8/2008 |
| WO | 2009/019520 | 2/2009 |
| WO | 2009/047387 | 4/2009 |
| WO | 2009/047392 | 4/2009 |
| WO | 2009/067350 | 5/2009 |
| WO | 2009/099684 | 8/2009 |
| WO | 2009/118357 | 10/2009 |
| WO | 2009/118363 | 10/2009 |
| WO | 2009/126508 | 10/2009 |
| WO | 2009/131757 | 10/2009 |
| WO | 2010/002792 | 1/2010 |
| WO | 2011/146262 | 11/2011 |
| WO | 2012/009207 | 1/2012 |
| WO | 2012/012260 | 1/2012 |
| WO | 2012/062924 | 5/2012 |
| WO | 2012/078422 | 6/2012 |
| WO | 2012/088546 | 6/2012 |
| WO | 2012/115754 | 8/2012 |
| WO | 2013/043485 | 3/2013 |
| WO | 2013/090229 | 6/2013 |
| WO | 2014/031965 | 2/2014 |
| WO | 2014/210150 | 12/2014 |

OTHER PUBLICATIONS

Adam, J. "Catalytic conversion of biomass to produce higher quality liquid bio-fuels," PhD Thesis, Department of Energy and Process Engineering, The Norwegian University of Science and Technology, Trondheim (2005).

Adam, J. et al. "Pyrolysis of biomass in the presence of Al-MCM-41 type catalysts," *Fuel*, 84 (2005) 1494-1502.

Adjaye, John D. et al. "Catalytic conversion of a biomass-derived oil to fuels and chemicals I: Model compound studies and reaction pathways," *Biomass & Bioenergy*, 8:3 (1995) 131-149.

Adjaye, John D. et al. "Catalytic conversion of a biomass-derived oil to fuels and chemicals II: Chemical kinetics, parameter estimation and model predictions," *Biomass & Bioenergy*, 8:4 (1995) 265-277.

Adjaye, John D. et al. "Catalytic conversion of wood derived bio-oil to fuels and chemicals," *Studies in Surface Science and Catalysis*, 73 (1992) 301-308.

Adjaye, John D. et al. "Production of hydrocarbons by the catalytic upgrading of a fast pyrolysis bio-oil," *Fuel Process Technol*, 45:3 (1995) 161-183.

Adjaye, John D. et al. "Upgrading of a wood-derived oil over various catalysts," *Biomass & Bioenergy*, 7:1-6 (1994) 201-211.

Aho, A. et al. "Catalytic pyrolysis of woody biomass in a fluidized bed reactor; Influence of zeolites structure, Science Direct," *Fuel*, 87 (2008) 2493-2501.

Antonakou, E. et al. "Evaluation of various types of Al-MCM-41 materials as catalysts in biomass pyrolysis for the production of bio-fuels and chemicals," *Fuel*, 85 (2006) 2202-2212.

Atutxa, A. et al. "Kinetic Description of the Catalytic Pyrolysis of Biomass in a Conical Spouted Bed Reactor," *Energy Fuels*, 19:3 (2005) 765-774.

Baker, E. G. et al. "Catalytic Upgrading of Biomass Pyrolysis Oils," in Bridgwater, A. V. et al. (eds) *Research in Thermochemical Biomass Conversion*, Elsevier Science Publishers Ltd., Barking, England (1988) 883-895.

Baldauf, W. et al. "Upgrading of flash pyrolysis oil and utilization in refineries," *Biomass & Bioenergy*, 7 (1994) 237-244.

Baumlin, "The continuous self stirred tank reactor: measurement of the cracking kinetics of biomass pyrolysis vapours," *Chemical Engineering Science*, 60 (2005) 41-55.

Berg, "Reactor Development for the Ultrapyrolysis Process," *The Canadian Journal of Chemical Engineering*, 67 (1989) 96-101.

Bielansky, P. et al. "Catalytic conversion of vegetable oils in a continuous FCC pilot plant," *Fuel Processing Technology*, 92 (2011) 2305-2311.

Bimbela, F. et al. "Hydrogen production by catalytic steam reforming of acetic acid, a model compound of biomass pyrolysis liquids," *J. Ana App. Pyrolysis*, 79 (2007) 112-120.

Bridgwater et al. (eds) *Fast Pyrolysis of Biomass: A Handbook*, Newbury Cpl Press, Great Britain (2008) 1-13.

Bridgwater, A.V. "Principles and practices of biomass fast pyrolysis processes for liquids," *Journal of Analytical and Applied Pyrolysis*, 51 (1999) 3-22.

Bridgwater, Tony "Production of high grade fuels and chemicals from catalytic pyrolysis of biomass," *Catalysis Today*, 29 (1996) 285-295.

Bridgwater, Tony et al. "Transport fuels frombiomass by thermal processing," *EU—China Workshop on Liquid Biofuels*, Beijing, China (Nov. 4-5, 2004).

Buchsbaum, A. et al. "The Challenge of the Biofuels Directive for a European Refinery," *OMW Refining and Marketing*, ERTC 9th Annual Meeting, Prague, Czech Republic (Nov. 15-17, 2004).

Carlson, T. et al. "Aromatic Production from Catalytic Fast Pyrolysis of Biomass-Derived Feedstocks," *Top Catal*, 52 (2009) 241-242.

Carlson., T. et al. "Green Gasoline by Catalytic Fast Pyrolysis of Solid Biomass Derived Compounds," *ChemSusChem*, 1 (2008) 397-400.

(56) References Cited

OTHER PUBLICATIONS

Cass et al. "Challenges in the Isolation of Taxanes from *Taxus canadensis* by Fast Pyrolysis," *J Analytical and Applied Pyrolysis* 57 (2001) 275-285.
Chantal, P. D. et al. "Production of Hydrocarbons from Aspen Poplar Pyrolytic Oils over H-ZSM5," *Applied Catalysis*, 10 (1984) 317-332.
Chen, N. Y. et al. "Fluidized Upgrading of Wood Pyrolysis Liquids and Related Compounds," in Soltes, E. J. et al. (eds) *Pyrolysis Oils from Biomass*, ACS, Washington, DC (1988) 277-289.
Chinsuwan, A. et al. "An experimental investigation of the effect of longitudinal fin orientation on heat transfer in membrane water wall tubes in a circulating fluidized bed," *International Journal of Heat and Mass Transfer*, 52:5-6 (2009) 1552-1560.
Cornelissen, T. et al., "Flash co-pyrolysis of biomass with polylactic acid. Part 1: Influence on bio-oil yield and heating value," *Fuel* 87 (2008) 1031-1041.
Cousins, A. et al. "Development of a bench-scale high-pressure fluidized bed reactor and its sequential modification for studying diverse aspects of pyrolysis and gasification of coal and biomass," *Energy and Fuels*, 22:4 (2008) 2491-2503.
Cragg et al. "The Search for New Pharmaceutical Crops: Drug Discovery and Development at the National Cancer Institute," in Janick, J. and Simon, J.E. (eds) *New Crops*, Wiley, New York (1993) 161-167.
Czernik, S. et al. "Hydrogen from biomass-production by steam reforming of biomass pyrolysis oil," *Catalysis Today*, 129 (2007) 265-168.
Czernik, S. et al. "Hydrogren by Catalytic Steam Reforming of Liquid Byproducts from Biomass Thermoconversion Processes," *Ind. Eng. Chem. Res.*, 41 (2002) 4209-4215.
Dahmen, "Rapid pyrolysis for the pretreatment of biomass and generation of bioslurry as intermediate fuel", *Chemie-Ingenieur-Technik*, 79:9 (2007) 1326-1327. Language: German (Abstract only; Machine translation of Abstract).
Dandik, "Catalytic Conversion of Used Oil to Hydrocarbon Fuels in a Fractionating Pyrolysis Reactor," *Energy & Fuels*, 12 (1998) 1148-1152.
Daoust et al. "Canada Yew (*Taxus canadensis* Marsh.) and Taxanes: a Perfect Species for Field Production and Improvement through Genetic Selection," Natural Resources Canada, Canadian Forest Service, Sainte-Fov, Quebec (2003).
De Wild, P. et al. "Lignin valorisation for chemicals and (transportation) fuels via (catalytic) pyrolysis and hydrodeoxygenation," *Environ. Prog. Sustainable Energy*, 28 (2009) 461-469.
Demirbas, Ayhan "Fuel Conversional Aspects of Palm Oil and Sunflower Oil," *Energy Sources*, 25 (2003) 457-466.
Di Blasi, C. et al. "Effects of Potassium Hydroxide Impregnation of Wood Pyrolysis, American Chemical Society," *Energy & Fuels* 23 (2009) 1045-1054.
Ellioti, D. "Historical Developments in Hydroprocessing Bio-oils," *Energy & Fuels*, 21 (2007) 1792-1815.
Ensyn Technologies Inc. "Catalytic de-oxygenation of biomass-derived RTP vapors." Prepared for *ARUSIA, Agenzia Regionale Umbria per lo Sviluppo e L'Innovazione*, Perugia, Italy (Mar. 1997).
Filtration, Kirk-Othmer Encyclopedia of Chemical Technology 5th Edition. vol. 11., John Wiley & Sons, Inc., Feb. 2005.
Gayubo, A. G. et al. "Deactivation of a HZSM-5 Zeolite Catalyst in the Transformation of the Aqueous Fraction of Biomass Pyrolysis Oil into Hydrocarbons," *Energy & Fuels*, 18:6 (2004) 1640-1647.
Gayubo, A. G. et al. "Undesired components in the transformation of biomass pyrolysis oil into hydrocarbons on an HZSM-5 zeolite catalyst," *J Chem Tech Biotech*, 80 (2005) 1244-1251.
Gevert, Börjie S. et al. "Upgrading of directly liquefied biomass to transportation fuels: catalytic cracking," *Biomass* 14:3 (1987) 173-183.
Goesele, W. et al., Filtration, Wiley-VCHVerlag GmbH & Co. KGaA, Weinheim, 10.1002/14356007.b02 10, 2005.

Grange, P. et al. "Hydrotreatment of pyrolysis oils from biomass: reactivity of the various categories of oxygenated compounds and preliminary techno-economical study," *Catalysis Today*, 29 (1996) 297-301.
Hama, "Biodiesel-fuel production in a packed-bed reactor using lipase-producing Rhizopus oryzae cells immobilized within biomass support particles", *Biochemical Engineering Journal*, 34 (2007) 273-278.
Hoekstra, E. et al., "Fast Pyrolysis of Biomass in a Fluidized Bed Reactor: In Situ Filtering of the Vapors," *Ind. Eng. Chern. Res.*, 48:10 (2009) 4744-4756.
Holton et al. "First Total Synthesis of Taxol. 2. Completion of the C and D Rings," *J Am Chem Soc*, 116 (1994) 1599-1600.
Horne, Patrick A. et al. "Catalytic coprocessing of biomass-derived pyrolysis vapours and methanol," *J. Analytical and Applied Pyrolysis*, 34:1 (1995) 87-108.
Horne, Patrick A. et al. "Premium quality fuels and chemicals from the fluidised bed pyrolysis of biomass with zeolite catalyst upgrading," *Renewable Energy*, 5:5-8 (1994) 810-812.
Horne, Patrick A. et al. "The effect of zeolite ZSM-5 catalyst deactivation during the upgrading of biomass-derived pyrolysis vapours," *J Analytical and Applied Pyrolysis*, 34:1 (1995) 65-85.
Huang et al. "New Taxanes from *Taxus brevifolia*," *J of Natural Products*, 49 (1986) 665-669.
Huffman, D. R. et al., Ensyn Technologies Inc., "Thermo-Catalytic Cracking of Wood to Transportation Fuels," DSS Contract No. 38SQ.23440-4-1429, Efficiency and Alternative Energy Technology Branch, Natural Resources Canada, Ottawa, Canada (1997).
Huffman, D. R., Ensyn Technologies Inc., "Thermo-catalytic cracking of wood to transportation fuels using the RTP process," DSS Contract No. 38SQ.23440-4-1429, Efficiency and Alternative Energy Technology Branch, Natural Resources Canada, Ottawa, Ontario (Jan. 1997).
Hughes, J. et al. "Structural variations in natural F, OH and Cl apatites," *American Mineralogist*, 74 (1989) 870-876.
Huie, C. W. "A review of modern sample-preparation techniques for the extraction and analysis of medicinal plants," *Anal Bioanal Chem*, 373 (2002) 23-30.
International Search Report dated Feb. 22, 2013 for corresponding International Application No. PCT/US2012/68876.
Ioannidou, "Investigating the potential for energy, fuel, materials and chemicals production from corn residues (cobs and stalks) by non-catalytic and catalytic pyrolysis in two reactor configurations," *Renewable and Sustainable Energy Reviews*, 13 (2009) 750-762.
Iojoiu, E. et al. "Hydrogen production by sequential cracking of biomass-derived pyrolysis oil over noble metal catalysts supported on ceria-zirconia," *Applied Catalysis A: General*, 323 (2007) 147-161.
Jackson, M. et al. "Screening heterogenous catalysts for the pyrolysis of lignin," *J. Anal. Appl. Pyrolysis*, 85 (2009) 226-230.
Junming et al. "Bio-oil upgrading by means of ethyl ester production in reactive distillation to remove water and to improve storage and fuel characteristics," *Biomass and Energy*, 32 (2008) 1056-1061.
Kalnes, Tom et al. "Feedstock Diversity in the Refining Industry," UOP Report to NREL and DOE (2004).
Khanal, "Biohydrogen Production in Continuous-Flow Reactor Using Mixed Microbial Culture," *Water Environment Research*, 78:2 (2006) 110-117.
Khimicheskaya Entsiklopediya. Pod red. N. S. Zefirov. Moskva, Nauchnoe Izdatelstvo "Bolshaya Rossyskaya Entsiklopediya", 1995, p. 133-137,529-530.
Kingston et al. "New Taxanes from *Taxus brevifolia*," *J of Natural Products*, 45 (1982) 466-470.
Lappas, A. A. et al. "Biomass pyrolysis in a circulating fluid bed reactor for the production of fuels and chemicals," *Fuel*, 81 (2002) 2087-2095.
Lappas, A.A. et al. "Production of Transportation Fuels from Biomass," *Workshop of Chemical Process Engineering Research Institute/Center for Research and Technology Hellas*, Thermi-Thessaloniki, Greece (2004).
Lappas, A.A., "Production of biofuels via co-processing in conventional refining process," *Catalysis Today*, 145 (2009) 55-62.

(56) References Cited

OTHER PUBLICATIONS

Maiti, R.N. et al. "Gas-liquid distributors for trickle-bed reactors: A review"; *Industrial and Engineering Chemistry Research*, 46:19 (2007) 6164-6182.

Mancosky, "The use of a controlled cavitation reactor for bio-diesel production," (abstract only), AIChE Spring National Meeting 2007, Houston, Texas.

Marker, Terry L., et al. "Opportunities for Biorenewables in Petroleum Refineries," Proceedings of the 230th ACS National Meeting, Washington, DC, Paper No. 125, Fuel Division (Aug. 31, 2005) (abstract only).

Marker, Terry L., et al., UOP, "Opportunities for Biorenewables in Oil Refineries," Final Technical Report, U.S. Department of Energy Award No. DE-FG36-05G015085, Report No. DOEGO15085Final (2005).

Marquevich, "Hydrogen from Biomass: Steam Reforming of Model Compounds of Fast-Pyrolysis Oil," *Energy & Fuels*, 13 (1999) 1160-1166.

Masoumifard, N. et al. "Investigation of heat transfer between a horizontal tube and gas-solid fluidized bed," *International Journal of Heat and Fluid Flow*, 29:5 (2008) 1504-1511.

McLaughlin et al. 19-Hydroxybaccatin III, 10-Deacetylcephalo-Mannine, and 10-Deacetyltaxol: New Anti-Tumor Taxanes from *Taxus wallichiana,*' *J of Natural Products*, 44 (1981) 312-319.

McNeil "Semisynthetic Taxol Goes on Market Amid Ongoing Quest for New Versions," *J of the National Cancer Institute*, 87:15 (1995) 1106-1108.

Meier, D. et al. "State of the art of applied fast pyrolysis of lignocellulosic materials—a review," *Bioresource Technology*, 68:1 (1999) 71-77.

Meier, D. et al., "Pyrolysis and Hydroplysis of Biomass and Lignins—Activities at the Institute of Wood Chemistry in Hamburg, Germany," vol. 40, No. 2, Preprints of Papers Presented at the 209th ACS National Meeting, Anaheim, CA (Apr. 2-7, 1995).

Mercader, F. et al. "Pyrolysis oil upgrading by high pressure thermal treatment," *Fuel*, 89:10 (2010) 2829-2837.

Miller et al. "Antileukemic Alkaloids from *Taxus wallichiana* Zucc,*" J Org Chem*, 46 (1981) 1469-1474.

Mohan, D. et al. "Pyrolysis of Wood/Biomass for Bio-oil: A Critical Review," *Energy Fuels*, 20:3 (2006) 848-849.

Newton "Taxol: A Case Study in Natural Products Chemistry," Lecture Notes, University of Southern Maine, http:/www.usm.maine.edu/ (2009) 1-6.

Nicolaou et al. "Total Synthesis of Taxol," *Nature*, 367 (1994) 630-634.

Nowakowski, D. et al. "Potassium catalysis in the pyrolysis behaviour of short rotation willow coppice," *Fuels*, 86 (2007) 2389-2402.

Ognisty, T. P. "The direct contact heat transfer performance of a spray nozzle, a notched through distributor, and two inch Pall rings," AIChE 1990 Spring National Meeting (Orlando Mar. 18-22, 1990) Preprint N. 37c 36P, Mar. 18, 1990.

Ohman "Bed Agglomeration Characteristics during Fluidized Bed Combustion of Biomass Fuels," *Energy & Fuels*, 14 (2000) 169-178.

Okumura, Y. et al. "Pyrolysis and gasification experiments of biomass under elevated pressure condition," Nihon Kikai Gakkai Ronbunshu, B Hen/Transactions of the Japan Society of Mechanical Engineers, Part B, vol. 73, No. 7, 2007, pp. 1434-1441.

Olazar, M. et al. "Pyrolysis of Sawdust in a Conical Spouted-Bed Reactor with a HZSM-5 Catalyst," *AIChE Journal*, 46:5 (2000) 1025-1033.

Onay "Influence of pyrolysis temperature and heating rate on the production of bio-oil and char from safflower seed by pyrolysis, using a well-swept fixed-bed reactor," *Fuel Processing Technology*, 88 (2007) 523-531.

Onay, "Production of Bio-Oil from Biomass: Slow Pyrolysis of Rapeseed (*Brassica napus* L.) in a Fixed-Bed Reactor," *Energy Sources*, 25 (2003) 879-892.

Ong et al. "Pressurized hot water extraction of bioactive or marker compounds in botanicals and medicinal plant materials," *J Chromatography A*, 1112 (2006) 92-102.

Ooi, Y. S. et al. "Catalytic Cracking of Used Palm Oil and Palm Oil Fatty Acids Mixture for the Production of Liquid Fuel: Kinetic Modeling." *J Am Chem Soc*, 18 (2004) 1555-1561.

Otterstedt, J. E. et al. "Catalytic Cracking of Heavy Oils," in Occelli, Mario L. (ed) Fluid Catalytic Cracking, Chapter 17, ACS, Washington, DC (1988) 266-278.

Padmaja, K.V. et al. "Upgrading of Candelilla biocrude to hydrocarbon fuels by fluid catalytic cracking," *Biomass and Bioenergy*, 33 (2009) 1664-1669.

Pavia et al., Intro to Org Labo Techniques (1988) 3d ed. Saunders College Publishing, Washington p. 62-66, 541-587.

PCT/US2012/055384 International Search Report, dated Mar. 28, 2013, and International Preliminary Report on Patentability, dated Mar. 25, 2014.

Pecora, A.A.B. et al., "Heat transfer coefficient in a shallow fluidized bed heat exchanger with a continuous flow of solid particles," *Journal of the Brazilian Society of Mechanical Sciences and Engineering*, 28:3 (2006) 253-258.

Pecora, A.A.B., et al., "An analysis of process heat recovery in a gas-solid shallow fluidized bed," *Brazilian Journal of Chemical Engineering*, 23:4 (2006) 497-506.

Petrik, P.T. et al. "Heat exchange in condensation of R227 coolant on inclined tubes placed in a granular BED," *Journal of Engineering Physics and Thermophysics*, 77:4 (2004) 758-761.

Prasad Y. S. et al. "Catalytic conversion of canola oil to fuels and chemical feedstocks. Part II. Effect of co-feeding steam on the performance of HZSM-5 catalyst," *Can J Chem Eng*, 64 (1986) 285-292.

Prins, Wolter et al. "Progress in fast pyrolysis technology," *Topsoe Catalysis Forum 2010*, Munkerupgaard, Denmark (Aug. 19-20, 2010).

Radlein, D. et al. "Hydrocarbons from the Catalytic Pyrolysis of Biomass," *Energy & Fuels*, 5 (1991) 760-763.

Rao "Taxol and Related Taxanes. I. Taxanes of *Taxus brevifolia Bark,*" *Pharm Res* 10:4 (1993) 521-524.

Rao et al. "A New Large-Scale Process for Taxol and Related Taxanes from *Taxus brevifolia,*" *Pharm Res*, 12:7 (1995) 1003-1010.

Ravindranath, G., et al., "Heat transfer studies of bare tube bundles in gas-solid fluidized bed", 9th International Symposium on Fluid Control Measurement and Visualization 2007, FLUCOME 2007, vol. 3, 2007, pp. 1361-1369.

Rodriguez, O.M.H. et al. "Heat recovery from hot solid particles in a shallow fluidized bed," *Applied Thermal Engineering*, 22:2 (2002) 145-160.

Samolada, M. C. et al. "Production of a bio-gasoline by upgrading biomass flash pyrolysis liquids via hydrogen processing and catalytic cracking," *Fuel*, 77:14 (1998) 1667-1674.

Sang "Biofuel Production from Catalytic Cracking of Palm Oil," *Energy Sources*, 25 (2003) 859-869.

Scahill, J. et al. "Removal of Residual Char Fines from Pyrolysis Vapors by Hot Gas Filtration," in Bridgwater, A. V. et al. (eds) *Developments in Thermochemical Biomass Conversion*, Springer Science+Business Media, Dordrecht (1997) 253-266.

Scott, D. et al. Pretreatment of poplar wood for fast pyrolysis: rate of cation removal, *Journal of Analytical and Applied Pyrolysis*, 57 (2000) 169-176.

Senilh et al. "Mise en Evidence de Nouveaux Analogues du Taxol Extraits de *Taxus baccata,*" *J of Natural Products*, 47 (1984) 131-137. (English Abstract included).

Sharma, R. "Upgrading of pyrolytic lignin fraction of fast pyrolysis oil to hydrocarbon fuels over HZSM-5 in a dual reactor system," *Fuel Processing Technology*, 35 (1993) 201-218.

Sharma, R. K. et al. "Catalytic Upgrading of Pyrolysis Oil," *Energy & Fuels*, 7 (1993) 306-314.

Sharma, R. K. et al. "Upgrading of wood-derived bio-oil over HZSM-5," *Bioresource Technology*, 35:1 (1991) 57-66.

Smith R.M. "Extractions with superheated water," *J Chromatography A*, 975 (2002) 31-46.

(56) References Cited

OTHER PUBLICATIONS

Snader "Detection and Isolation," in Suffness, M. (ed) *Taxol-Science and Applications*, CRC Press, Boca Raton, Florida (1995) 277-286.
Srinivas, S.T. et al "Thermal and Catalytic Upgrading of a Biomass-Derived Oil in a Dual Reaction System," *Can. J. Chem. Eng.*, 78 (2009) 343-354.
Stierle et al "The Search for Taxol-Producing Microorganism Among the Endophytic Fungi of the Pacific Yew, *Taxus brevifolia*," *J of Natural Products*, 58 (1995) 1315-1324.
Stojanovic, B. et al. "Experimental investigation of thermal conductivity coefficient and heat exchange between fluidized bed and inclined exchange surface," *Brazilian Journal of Chemical Engineering*, 26:2 (2009) 343-352.
Sukhbaatar, B. "Separation of Organic Acids and Lignin Fraction From Bio-Oil and Use of Lignin Fraction in Phenol-Formaldehyde Wood Adhesive Resin," *Master's Thesis*, Mississippi State (2008).
Twaiq, A. A. et al. "Performance of composite catalysts in palm oil cracking for the production of liquid fuels and chemicals," *Fuel Processing Technology*, 85 (2004) 1283-1300.
Twaiq, F. A. et al. "Liquid hydrocarbon fuels from palm oil by catalytic cracking over aluminosilicate mesoporous catalysts with various Si/Al ratios," *Microporous and Mesoporous Materials*, 64 (2003) 95-107.
Tyson, K. et al. "Biomass Oil Analysis: Research Needs and Recommendations," National Renewable Energy Laboratory, Report No. NREL/TP-510-34796 (Jun. 2004).
Valle, B. et al. "Integration of Thermal Treatment and Catalytic Transformation for Upgrading Biomass Pyrolysis Oil," *International Journal of Chemical Reactor Engineering*, 5:1 (2007).
Vasanova, L.K. "Characteristic features of heat transfer of tube bundles in a cross water-air flow and a three-phase fluidized bed," *Heat Transfer Research*, 34:5-6 (2003) 414-420.
Vitolo, S. et al. "Catalytic upgrading of pyrolytic oils over HZSM-5 zeolite: behaviour of the catalyst when used in repeated upgrading-regenerating cycles," *Fuel*, 80 (2001) 17-26.
Vitolo, S. et al. "Catalytic upgrading of pyrolytic oils to fuel over different zeolites," *Fuel*, 78:10 (1999) 1147-1159.
Wang, Xianhua et al., "The Influence of Microwave Drying on Biomass Pyrolysis," *Energy & Fuels* 22 (2008) 67-74.
Westerhof, Roel J. M. et al., "Controlling the Water Content of Biomass Fast Pyrolysis Oil," *Ind. Eng. Chem. Res.* 46 (2007) 9238-9247.
Williams, Paul T. et al. "Characterisation of oils from the fluidised bed pyrolysis of biomass with zeolite catalyst upgrading," *Biomass and Bioenergy*, 7:1-6 (1994) 223-236.
Williams, Paul T. et al. "Comparison of products from the pyrolysis and catalytic pyrolysis of rice husks," *Energy*, 25:6 (2000) 493-513.
Williams, Paul T. et al. "The influence of catalyst type on the composition of upgraded biomass pyrolysis oils," *J Analytical and Applied Pyrolysis*, 31 (1995) 39-61.
Yukimune et al. "Methyl Jasmonate-induced Overproduction of Paclitaxel and Baccatin III in Taxus Cell Suspension Cultures," *Nature Biotechnology* 14 (1996) 1129-1132.
Zhang et al. "Investigation on initial stage of rapid pyrolysis at high pressure using Taiheiyo coal in dense phase," *Fuel*, 81:9 (2002) 1189-1197.
Zhang, "Hydrodynamics of a Novel Biomass Autothermal Fast Pyrolysis Reactor: Flow Pattern and Pressure Drop," *Chem. Eng. Technol.*, 32:1 (2009) 27-37.
Graham, R.G. et al. "Thermal and Catalytic Fast Pyrolysis of Lignin by Rapid Thermal Processing (RPT)," Seventh Canadian Bioenergy R&D Seminar, Skyline Hotel, Ottawa, Ontario, Canada, Apr. 24-26, 1989.
Wisner, R. "Renewable Identification Nos. (RINs) and Government Biofuels Blending Mandates," *AgMRC Renewable Energy Newsletter* (Apr. 2009), available at http://www.agmrc.org/renewable_energy/biofuelsbiorefining_general/renewable-identification-numbers-rins-and-government-biofuels-blending-mandates/.
Qi et al. "Review of biomass pyrolysis oil properties and upgrading research," *Energy Conversion & Management*, 48 (2007) 87-92.
Office Action, U.S. Appl. No. 14/346,517, dated Sep. 25, 2015.
Yoo et al. "Thermo-mechanical extrusion pretreatment for conversion of soybean hulls to fermentable sugars," *Bioresource Technology*, 102 (2011) 7583-7590.
Search Report, Intellectual Property Office of Singapore, dated Jun. 4, 2015, for corresponding SG 11201403208Y.
Written Opinion, Intellectual Property Office of Singapore, dated Jul. 31, 2015, for corresponding SG 11201403208Y.
Supplemental European Search Report, dated Sep. 4, 2015, for corresponding EP 12858367.1.
European Search Opinion, dated Sep. 11, 2015, for corresponding EP 12858367.1.
Extended European Search Report dated Feb. 19, 2016 for European Patent Application No. 12749454.0.

\* cited by examiner

HEAT REMOVAL AND RECOVERY IN BIOMASS PYROLYSIS

CROSS REFERENCE TO RELATED APPLICATIONS

This application is a continuation of U.S. application Ser. No. 13/031,701, filed Feb. 22, 2011, which is incorporated herein by reference in its entirety.

FIELD OF THE INVENTION

The present invention relates to pyrolysis methods and apparatuses in which a solid heat carrier (e.g., sand) is separated from the pyrolysis reactor effluent and cooled with a quench medium (e.g., water) to improve temperature control. Cooling with quench medium may occur in or above a fluidized bed of the heat carrier, in which solid char byproduct is combusted to provide some or all of the heat needed to drive the pyrolysis.

DESCRIPTION OF RELATED ART

Environmental concerns over fossil fuel greenhouse gas emissions have led to an increasing emphasis on renewable energy sources. Wood and other forms of biomass including agricultural and forestry residues are examples of some of the main types of renewable feedstocks being considered for the production of liquid fuels. Energy from biomass based on energy crops such as short rotation forestry, for example, can contribute significantly towards the objectives of the Kyoto Agreement in reducing greenhouse gas (GHG) emissions.

Pyrolysis is considered a promising route for obtaining liquid fuels, including transportation fuel and heating oil, from biomass feedstocks. Pyrolysis refers to thermal decomposition in the substantial absence of oxygen (or in the presence of significantly less oxygen than required for complete combustion). Initial attempts to obtain useful oils from biomass pyrolysis yielded predominantly an equilibrium product slate (i.e., the products of "slow pyrolysis"). In addition to the desired liquid product, roughly equal proportions of non-reactive solids (char and ash) and non-condensable gases were obtained as unwanted byproducts. More recently, however, significantly improved yields of primary, non-equilibrium liquids and gases (including valuable chemicals, chemical intermediates, petrochemicals, and fuels) have been obtained from carbonaceous feedstocks through fast (rapid or flash) pyrolysis at the expense of undesirable, slow pyrolysis products.

Fast pyrolysis refers generally to technologies involving rapid heat transfer to the biomass feedstock, which is maintained at a relatively high temperature for a very short time. The temperature of the primary pyrolysis products is then rapidly reduced before chemical equilibrium is achieved. The fast cooling therefore prevents the valuable reaction intermediates, formed by depolymerization and fragmentation of the biomass building blocks, namely cellulose, hemicellulose, and lignin, from degrading to non-reactive, low-value final products. A number of fast pyrolysis processes are described in U.S. Pat. No. 5,961,786; Canadian Patent Application 536, 549; and by Bridgwater, A. V., "Biomass Fast Pyrolysis," Review paper BIBLID: 0354-9836, 8 (2004), 2, 21-49. Fast pyrolysis processes include Rapid Thermal Processing (RTP), in which an inert or catalytic solid particulate is used to carry and transfer heat to the feedstock. RTP has been commercialized and operated with very favorable yields (55-80% by weight, depending on the biomass feedstock) of raw pyrolysis oil.

Pyrolysis processes such as RTP therefore rely on rapid heat transfer from the solid heat carrier, generally in particulate form, to the pyrolysis reactor. The combustion of char, a solid byproduct of pyrolysis, represents an important source of the significant heat requirement for driving the pyrolysis reaction. Effective heat integration between, and recovery from, the pyrolysis reaction and combustion (or reheater) sections represents a significant objective in terms of improving the overall economics of pyrolysis, under the operating constraints and capacity of the equipment, for a given feedstock. As a result, there is an ongoing need in the art for pyrolysis methods with added flexibility in terms of managing the substantial heat of combustion, its transfer to the pyrolysis reaction mixture, and its recovery for use in other applications.

SUMMARY OF THE INVENTION

The present invention is associated with the discovery of pyrolysis methods and apparatuses that allow effective heat removal, for example when necessary to achieve a desired throughput. Depending on the pyrolysis feed used, the processing capacity may become constrained, not by the size of the equipment, but by the ability to remove heat from the overall system, as required to operate within design temperatures. While some heat removal schemes, such as passing the recycled heat carrier (e.g., sand) through a cooler, may be effective in certain circumstances, they may not be applicable to all pyrolysis systems in terms of meeting cost and performance objectives. The methods and apparatuses described herein, involving the use of a quench medium, represent generally less expensive alternatives for providing needed heat removal. The quench medium may be used effectively alone or in combination with other types of cooling, for example a sand cooler.

The quench medium may therefore act as either a primary or secondary type of heat removal, allowing greater control of process temperatures, and particularly in the reheater where char, as a solid byproduct of pyrolysis, is combusted. Associated with this heat removal is added operational flexibility in terms of biomass feedstock type and processing capacity, which are often constrained by a maximum operating temperature rather than equipment size. In a particular of pyrolysis operation, a quench medium is distributed to one or more locations within the reheater vessel, thereby cooling this vessel if a sand cooler is either not used (e.g., in view of cost considerations) or otherwise removes excess heat to an insufficient extent. Often, the reheater vessel is operated with a fluidized bed of particles of the solid heat carrier, through which an oxygen-containing combustion medium is passed, in order to combust the char and generate some or all of the heat required for the pyrolysis. The fluidized bed comprises a dense phase bed below a dilute phase of the particles of the solid heat carrier.

A quench medium may be sprayed, for example, on the top of a heat carrier such as sand, residing in the reheater as a fluidized particle bed. Heat is thereby removed, for example, by conversion of water, as a quench medium, to steam. The consumption of heat advantageously reduces the overall temperature of the reheater and/or allows the pyrolysis unit to operate at a target capacity. Distributors may be located in various positions to introduce the quench medium at multiple points, for example within the dense phase bed and/or in the dilute phase, above the dense phase. Dilute phase introduction of the quench medium helps prevent dense phase bed disruptions due to sudden volume expansion (e.g., of water upon being converted to steam) in the presence of a relatively high density of solid particles. Such disruptions may detrimentally lead to increased solid particle entrainment and losses. Dense phase introduction (e.g., directly into a middle section of the dense phase bed), on the other hand, provides direct cooling of the solid particles. Such cooling is effective if introduction is carried out with sufficient control, and at a quench medium flow rate, that avoids significant disruptions of the dense phase bed. In some cases, quench medium may be introduced both into, and above, the dense phase bed, and even at multiple locations within and above the bed.

Embodiments of the invention are therefore directed to pyrolysis methods comprising combining biomass and a solid heat carrier (e.g., solid particulate that has been heated in a reheater and recycled) to provide a pyrolysis reaction mixture, for example in a Rapid Thermal Processing (RTP) pyrolysis unit. The reaction mixture may, for example, be formed upon mixing the biomass and solid heat carrier at the bottom of, or below, an upflow pyrolysis reactor. The mixture is then subjected to pyrolysis conditions, including a rapid increase in the temperature of the biomass to a pyrolysis temperature and a relatively short residence time at this temperature, to provide a pyrolysis effluent. The appropriate conditions are normally achieved using an oxygen-depleted (or oxygen-free) transport gas that lifts the pyrolysis reaction mixture through an upflow pyrolysis reactor. Following pyrolysis, the pyrolysis effluent is separated (e.g., using a cyclone separator) into (1) a solids-enriched fraction comprising both solid char and a recycled portion of the solid heat carrier and (2) a solids-depleted fraction comprising pyrolysis products. Pyrolysis products include, following cooling, (1) liquid pyrolysis products that are condensed, such as raw pyrolysis oil and valuable chemicals, as well as (2) non-condensable gases such as $H_2$, CO, $CO_2$, methane, and ethane. The solids-enriched fraction is then contacted with an oxygen-containing combustion medium (e.g., air or nitrogen-enriched air) to combust at least a portion of the solid char and reheat the recycled portion of the heat carrier, which in turn transfers heat to the pyrolysis reaction mixture. As discussed above, the solids-enriched fraction is also contacted, for example in a reheater containing a fluidized bed of the heat carrier, with a quench medium to reduce or limit the temperature in the reheater or otherwise the temperature of the recycled portion of the solid heat carrier.

Further embodiments of the invention are directed to apparatuses for pyrolysis of a biomass feedstock. Representative apparatuses comprise an upflow, entrained bed pyrolysis reactor that may include, for example, a tubular reaction zone. The apparatuses also comprise a cyclone separator having (1) an inlet in communication with an upper section (e.g., a pyrolysis effluent outlet) of the reactor (2) a solids-enriched fraction outlet in communication with a reheater, and (3) a solids-depleted fraction outlet in communication with a pyrolysis product condensation section. The apparatuses further comprise a quench liquid distribution system in communication with the reheater, for the introduction of quench medium and consequently the removal of heat from within this vessel.

Yet further embodiments of the invention are directed to a reheater for combusting solid char that is separated from a pyrolysis effluent. Combustion occurs in the presence of a solid heat carrier that is recycled to the pyrolysis reactor. The reheater comprises one or more points of quench medium introduction. In the case of multiple points of introduction, these will generally be positioned at different axial lengths along the reheater. Points of introduction may also include distributors of the quench medium, as well as control systems for regulating the flow of the quench medium, for example, in response to a measured temperature either in the dense phase bed or dilute phase of the solid heat carrier.

These and other embodiments and aspects relating to the present invention are apparent from the following Detailed Description.

Figure 1:
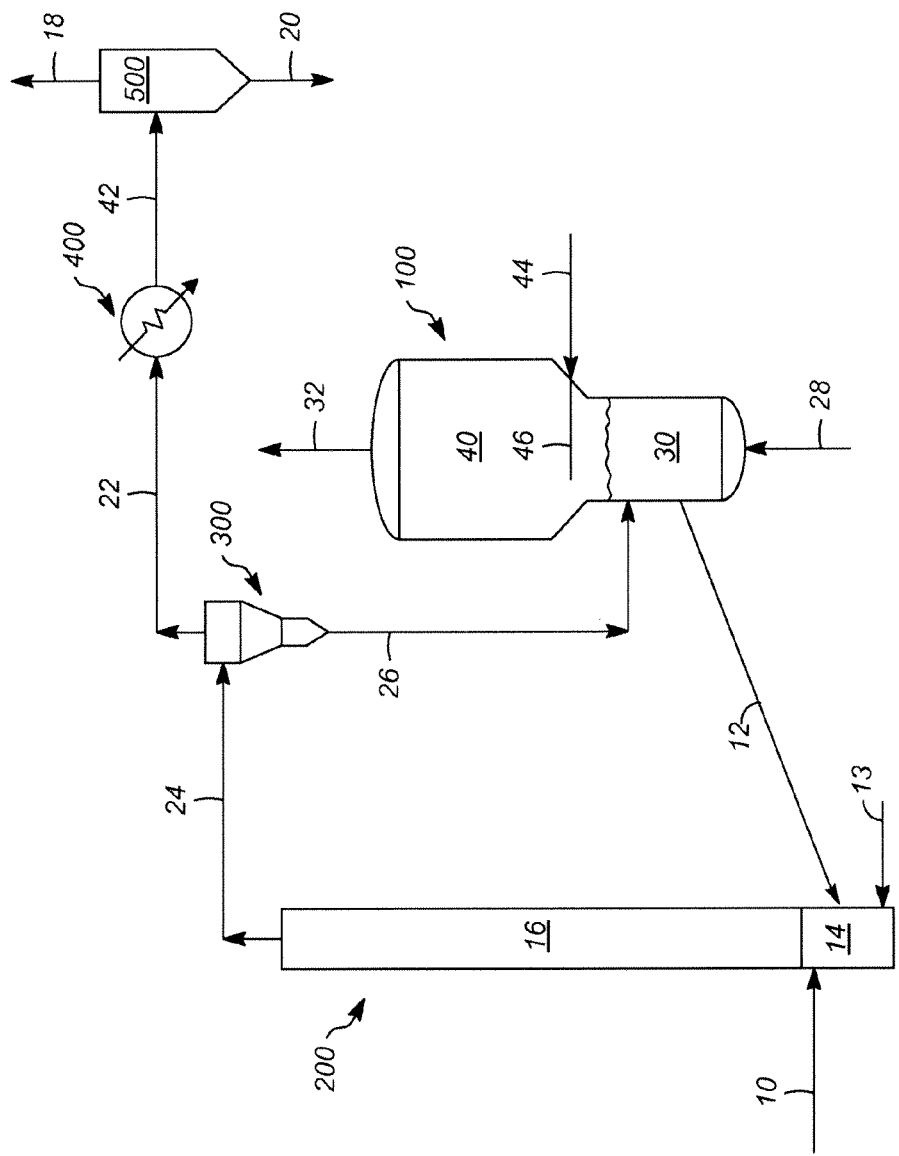
FIG. 1 depicts a representative pyrolysis process including a reactor and reheater.
Figure 2:
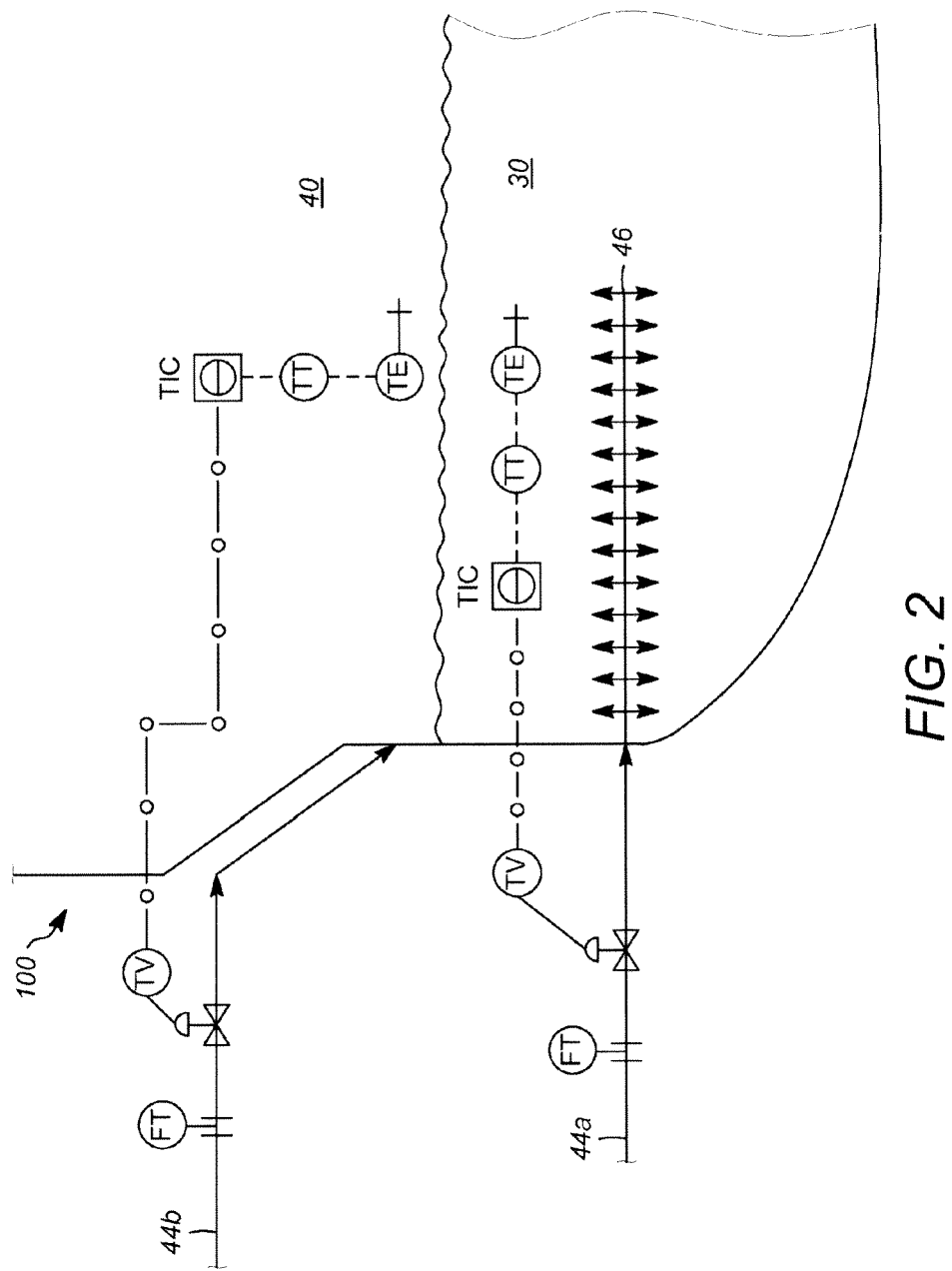
FIG. 2 is a close-up view of quench medium entering a reheater both within a dense phase bed of solid heat carrier, as well as in a dilute phase above the dense phase bed.

The features referred to in FIGS. 1 and 2 are not necessarily drawn to scale and should be understood to present an illustration of the invention and/or principles involved. Some features depicted have been enlarged or distorted relative to others, in order to facilitate explanation and understanding. Pyrolysis methods and apparatuses, as described herein, will have configurations, components, and operating parameters determined, in part, by the intended application and also the environment in which they are used.

DETAILED DESCRIPTION

According to representative embodiments of the invention, the biomass subjected to pyrolysis in an oxygen depleted environment, for example using Rapid Thermal Processing (RTP), can be any plant material, or mixture of plant materials, including a hardwood (e.g., whitewood), a softwood, or a hardwood or softwood hark. Energy crops, or otherwise agricultural residues (e.g., logging residues) or other types of plant wastes or plant-derived wastes, may also be used as plant materials. Specific exemplary plant materials include corn fiber, corn stover, and sugar cane bagasse, in addition to "on-purpose" energy crops such as switchgrass, miscanthus, and algae. Short rotation forestry products, as energy crops, include alder, ash, southern beech, birch, eucalyptus, poplar, willow, paper mulberry, Australian blackwood, sycamore, and varieties of paulownia elongate. Other examples of suitable biomass include organic waste materials, such as waste paper and construction, demolition, and municipal wastes.

A representative pyrolysis method is illustrated in FIG. 1. According to this embodiment, biomass 10 is combined with solid heat carrier 12, which has been heated in reheater 100 and recycled. Biomass 10 is generally subjected to one or more pretreatment steps (not shown), including particle size adjustment and drying, prior to being combined with solid heat carrier 12. Representative average particle sizes for biomass 10 are typically from about 1 mm to about 10 mm. Upon being combined with solid heat carrier 12, biomass 10 becomes rapidly heated, for example in a mixing zone 14 located at or near a lower section (e.g., the bottom) of pyrolysis reactor 200 that contains an elongated (e.g., tubular) reaction zone 16. The relative quantity of solid heat carrier 12 may be adjusted as needed to achieve a desired rate of temperature increase of biomass 10. For example, weight ratios of the solid carrier 12 to biomass 10 from about 10:1 to about 500:1 are normally used to achieve a temperature increase of 1000° C./sec (1800° F./sec) or more.

The combination of biomass 10 and solid heat carrier 2 therefore forms a hot pyrolysis reaction mixture, having a temperature generally from about 300° C. (572° F.) to about 1100° C. (2012° F.), and often from about 400° C. (752° F.) to about 700° C. (1292° F.). The temperature of the pyrolysis reaction mixture is maintained over its relatively short duration in reaction zone 16, prior to the pyrolysis effluent 24 being separated. A typical pyrolysis reactor operates with the flow of the pyrolysis reaction mixture in the upward direction (e.g., in an upflow, entrained bed pyrolysis reactor), through reaction zone 16, such that pyrolysis conditions are maintained in this zone for the conversion of biomass 10. Upward flow is achieved using transport gas 13 containing little or no oxygen, for example containing some or all of non-condensable gases 18 obtained after condensing liquid pyrolysis product(s) 20 from a solids-depleted fraction 22, comprising a mixture of gaseous and liquid pyrolysis products. These non-condensable gases 18 normally contain $H_2$, CO, $CO_2$, methane, and/or ethane. Some oxygen may enter the pyrolysis reaction mixture, however, from reheater 100, where char is combusted in the presence of oxygen-containing combustion medium 28, as discussed in greater detail below.

Transport gas 13 is therefore fed to pyrolysis reactor 200 at a flow rate sufficient to attain a gas superficial velocity through mixing zone 14 and reaction zone 16 that entrains the majority, and usually substantially all, solid components of the pyrolysis reaction mixture. Representative gas superficial velocities are greater than 1 meter per second, and often greater than 2 meters per second. The transport gas 13 is shown in FIG. 1 entering a lower section of mixing zone 14 of reactor 200. The superficial velocity of this gas in reaction zone 16 is also sufficient to obtain a short residence time of the pyrolysis reaction mixture in this zone, typically less than about 2 seconds. As discussed above, rapid heating and a short duration at the reaction temperature prevent formation of the less desirable equilibrium products in favor of the more desirable non-equilibrium products. Solid heat carriers, suitable for transferring substantial quantities of heat for rapid heating of biomass 10 include inorganic particulate materials having an average particle size typically from about 25 microns to about 1 mm. Representative solid heat carriers are therefore inorganic refractory metal oxides such as alumina, silica, and mixtures thereof. Sand is a preferred solid heat carrier.

The pyrolysis reaction mixture is subjected to pyrolysis conditions, including a temperature, and a residence time at which the temperature is maintained, as discussed above. Pyrolysis effluent 24 comprising the solid pyrolysis byproduct char, the solid heat carrier, and the pyrolysis products, is removed from an upper section of pyrolysis reactor 200, such as the top of reaction zone 16 (e.g., a tubular reaction zone) of this reactor 200. Pyrolysis products, comprising both non-condensable and condensable components of pyrolysis effluent 24, may be recovered after separation of solids, including char and heat carrier. Cooling, to promote condensation, and possibly further separation steps are used to provide one or more liquid pyrolysis product(s). A particular liquid pyrolysis product of interest is raw pyrolysis oil, which generally contains 30-35% by weight of oxygen in the form of organic oxygenates such as hydroxyaldehydes, hydroxyketones, sugars, carboxylic acids, and phenolic oligomers as well as dissolved water. For this reason, although a pourable and transportable liquid fuel, the raw pyrolysis oil has only about 55-60% of the energy content of crude oil-based fuel oils. Representative values of the energy content are in the range from about 19.0 MJ/liter (69,800 BTU/gal) to about 25.0 MJ/liter (91,800 BTU/gal). Moreover, this raw product is often corrosive and exhibits chemical instability due to the presence of highly unsaturated compounds such as olefins (including diolefins) and alkenylaromatics.

Hydroprocessing of this pyrolysis oil is therefore beneficial in terms of reducing its oxygen content and increasing its stability, thereby rendering the hydroprocessed product more suitable for blending in fuels, such as gasoline, meeting all applicable specifications. Hydroprocessing involves contacting the pyrolysis oil with hydrogen and in the presence of a suitable catalyst, generally under conditions sufficient to convert a large proportion of the organic oxygen in the raw pyrolysis oil to CO, $CO_2$ and water that are easily removed. The term "pyrolysis oil," as it applies to a feedstock to the hydroprocessing step, refers to the raw pyrolysis oil obtained directly from pyrolysis (e.g., RTP) or otherwise refers to this raw pyrolysis oil after having undergone pretreatment such as filtration to remove solids and/or ion exchange to remove soluble metals, prior to the hydroprocessing step.

As illustrated in the embodiment of FIG. 1, pyrolysis effluent 24, exiting the upper section of pyrolysis reactor 200, is separated using cyclone 300 into solids-enriched and solids-depleted fractions 26, 22. These fractions are enriched and depleted, respectively, in their solids content, for example measured in weight percent, relative to pyrolysis effluent 24. Solids-enriched fraction 26 comprises a substantial proportion (e.g., greater than about 90% by weight) of the solid char and solid heat carrier contained in pyrolysis effluent 24. In addition to char, solids-enriched fraction also generally contains other low value byproducts of pyrolysis, such as coke and heavy tars. According to alternative embodiments, multiple stages of solids separation (e.g., using two or more cyclones) may be used to improve separation efficiency, thereby generating multiple solids-enriched fractions, some or all of which enter reheater 100. In any event, the portion of solid heat carrier contained in pyrolysis effluent and entering reheater 100, whether in one or more solids-enriched fractions, is namely a recycled portion. This recycled portion, in addition to the solid char exiting cyclone 300 and possibly other solids separators, enter reheater 100 used to combust the char and reheat the solid heat carrier for further use in transferring heat to biomass 10.

Solids-depleted fraction 22 may be cooled, for example using cooler 400 to condense liquid pyrolysis products such as raw pyrolysis oil and optionally, following additional separation/purification steps, valuable chemicals including carboxylic acids, phenolics, and ketones. As illustrated in FIG. 1, cooled pyrolysis product 42 is passed to separator 500 which may be a single-stage flash separator to separate non-condensable gases 18 from liquid pyrolysis product(s) 20. Otherwise, multiple stages of vapor-liquid equilibrium contacting may be achieved using suitable contacting devices such as contacting trays or solid packing materials.

Rapid cooling of solids-depleted fraction 22 is generally desired to limit the extent of pyrolysis reactions occurring beyond the relatively short residence time in reaction zone 16. Cooling may be achieved using direct or indirect heat exchange, or both types of heat exchange in combination. An example of a combination of heat exchange types involves the use of a quench tower in which a condensed liquid pyrolysis product is cooled indirectly, recycled to the top of the tower, and contacted counter-currently with the hot, rising vapor of solids-depleted fraction 22. As discussed above, solids-depleted fraction 22 comprises gaseous and liquid pyrolysis products, including raw pyrolysis oil that is recovered in downstream processing. Accordingly, cyclone 300 has (i) an inlet in communication with an upper section of pyrolysis reactor 200, in addition to (ii) a solids-enriched fraction outlet in communication with reheater 100 and (iii) a solids-depleted fraction outlet in communication with a pyrolysis product condensation section. Namely, the cyclone inlet may correspond to the conduit for pyrolysis effluent 24, the solids-enriched fraction outlet may correspond to the conduit for solids-enriched fraction 26, and the solids-depleted fraction outlet may correspond to the conduit for solids-depleted fraction 22. A representative pyrolysis product condensation section may correspond to cooler 400 and separator 500.

As illustrated in the representative embodiment of FIG. 1, solids-enriched fraction 26 exiting cyclone 300 (possibly in combination with one or more additional solids-enriched fractions) is contacted with an oxygen-containing combustion medium 28 in reheater 100 to combust at least a portion of the solid char entering this vessel with solids-enriched fraction 26. A representative oxygen-containing combustion medium is air. Nitrogen-enriched air may be used to limit the adiabatic temperature rise of the combustion, if desired. The combustion heat effectively reheats the recycled portion of the solid carrier. The heated solid carrier is, in turn, used for the continuous transfer of heat to the pyrolysis reaction mixture, in order to drive the pyrolysis reaction. As discussed above, reheater 100 generally operates as a fluidized bed of solid particles, with the oxygen-containing combustion medium serving as a fluidization medium, in a manner similar in operation to a catalyst regenerator of a fluid catalytic cracking (FCC) process, used in crude oil refining. Combustion generates flue gas 32 exiting reheater 100, and, according to some embodiments, flue gas 32 may be passed to a solids separator such as cyclone 300 to remove entrained solids. The fluidized bed comprises dense phase bed 30 (e.g., a bubbless, bubbling, slugging, turbulent, or fast fluidized bed) of the solid heat carrier in a lower section of reheater 100, below a dilute phase 40 of these particles, in an upper section of reheater 100. One or more cyclones may also be internal to reheater 100, for performing the desired separation of entrained solid particles and return to dense phase bed 30.

Aspects of the invention relate to the use of a quench medium for improving the overall management of heat in pyrolysis systems. For example, heat removal from the solid carrier, and heat transfer to the quench medium, may be achieved by direct heat exchange between the quench medium and the solid carrier. Advantageously, the temperature of the recycled portion of the solid heat carrier, which is passed to reheater 100 as described above, is limited (e.g., to a maximum design temperature) by direct contact between this solid heat carrier and quench medium 44 in reheater 100. In some cases, this limitation of the combustion temperature can allow an increase in the operating capacity of the overall pyrolysis system. A preferred quench medium is water or an aqueous solution having a pH that may be suited to the construction material of the reheater or otherwise may have the capability to neutralize rising combustion gases. In some cases, for example, the use of dilute caustic solution, having in pH in the range from about 8 to about 12, can effectively neutralize acidic components present in the combustion gases. Preferably, quench medium 44 is introduced to reheater 100 through distributor 46.

FIG. 2 illustrates, in greater detail, a particular embodiment of contacting the quench medium with the solids-enriched fraction recovered from the pyrolysis effluent. According to this embodiment, a quench liquid distribution and control system is in communication with the reheater. In particular, FIG. 2 shows portions of quench medium 44a, 44b being introduced to reheater 100 at two separate points (to which conduits for quench medium portions 44a, 44b lead) along its axial length. In general, therefore, the quench medium may be introduced at one or more positions along the axial length of the reheater and/or at one or more radial positions at a given axial length. Also, the quench medium may be introduced through one or more distributors at the one or more positions of introduction. According to the embodiment depicted in FIG. 2, a portion of quench medium 44b is introduced to reheater 100 above dense phase bed 30 of solid particulate comprising a recycled portion of the solid heat carrier, as described above. This portion of the quench medium is directed downwardly toward the surface of dense phase bed 30, but disruption of the bed is relatively minor, as vaporization of the quench medium occurs primarily in dilute phase 40. Also shown in FIG. 2 is another portion of quench medium 44a, introduced within dense phase bed 30 of the solid heat carrier, through distributor 46. Disruption of dense phase bed 30 is increased, but direct heat transfer is also increased, relative to the case of introduction of the portion of quench medium 44b into dilute phase 40. Introduction of quench medium into both dense phase bed 30 and dilute phase 40, for example at differing rates and/or at differing times, therefore allows alternative types of control (e.g., coarse control and fine control, respectively) of heat removal. According to further embodiments the methods described herein may further comprise flowing at least a portion of the solid heat carrier through a heat exchanger (not shown) such as a sand cooler, thereby adding another type of heat removal control.

According to the quench liquid distribution and control system depicted in the particular embodiment of FIG. 2, flows of portions of the quench medium 44a, 44b, introduced within and above dense phase bed 30, are controlled in response to temperatures measured within and above dense phase bed 30, respectively. Therefore, temperature elements TE in dense phase bed 30 and dilute phase 40, communicate through temperature transmitters TT and temperature indicator controllers TIC to temperature control valves TV. These valves, in response to the measured temperatures, adjust their variable percentage openings, as needed to provide sufficient flows of portions of quench medium 44a, 44b, in order to control the temperatures measured at temperature elements TE. Therefore, in response to a measured temperature in reheater 100 that is beyond a set point temperature, for example, due to an increase in flow rate, or a change in type, of biomass 10, the appropriate TIC(s) send signal(s) to the corresponding temperature control valve(s), which respond by increasing quench medium flow rate to reheater 100, optionally through one or more distributors 46. Accordingly, the quench liquid distribution and control systems described herein can effectively provide the greater operational flexibility needed in pyrolysis operations, in which increased capacity and/or the processing of variable biomass types is desired. A particular quench liquid distribution and control system is therefore represented by the combination of TE, TT, TIC, and TV, controlling the quench medium introduction at a given point.

Overall, aspects of the invention are directed to pyrolysis methods with improved heat control, and especially reheaters for combusting solid char, separated from a pyrolysis effluent, in the presence of a solid heat carrier that is recycled to the pyrolysis reactor to transfer heat and drive the pyrolysis. Advantageously, the reheater comprises one or more points of quench medium introduction along its axial length, optionally together with quench medium distributors and control systems as described above. Those having skill in the art, with the knowledge gained from the present disclosure, will recognize that various changes could be made in these pyrolysis methods without departing from the scope of the present invention. Mechanisms used to explain theoretical or observed phenomena or results, shall be interpreted as illustrative only and not limiting in any way the scope of the appended claims.

The invention claimed is:

1. An apparatus for pyrolysis of a biomass feedstock, comprising:
   i) a pyrolysis reactor;
   ii) a solid-gas cyclone separator in fluid communication with the pyrolysis reactor;
   iii) a reheater having a lower section and an upper section, the lower section configured to contain a dense phase bed of heat carrier particles, the upper section configured to contain a dilute phase of heat carrier particles, said reheater in fluid communication with the cyclone separator;
   iv) a quench liquid distribution system, comprising:
      a) a first quench liquid distributor in the lower section, the first quench liquid distributor positioned to be disposed within the dense phase bed; and
      b) a second quench liquid distributor in the upper section; and
   v) a reheater temperature control system that provides
      i) coarse control of heat removal from the reheater by adjusting a flow rate of a first quench stream through the first quench liquid distributor; and
      ii) fine control of heat removal from the reheater by adjusting a flow rate of a second quench stream through the second quench liquid distributor.

2. The apparatus of claim 1, wherein the reheater temperature control system is further configured to limit entrainment and loss of solids present in the dense phase bed.

3. The apparatus of claim 2, wherein the reheater temperature control system is configured to adjust the flow rate of the first quench stream and/or the flow rate of the second quench stream in response to a temperature measurement made in the lower section.

4. The apparatus of claim 3, wherein the reheater temperature control system is further configured to adjust the flow rate of the first quench stream and/or the flow rate of the second quench stream in response to a temperature measurement made in the upper section.

5. The apparatus of claim 4, wherein the reheater temperature control system comprises a plurality of temperature sensors, at least a first temperature sensor of the plurality of temperature sensors positioned in the lower section and at least a second temperature sensor of the plurality of temperature sensors positioned in the upper section.

6. The apparatus of claim 1, wherein the reheater temperature control system is configured to adjust the flow rate of the first quench stream and/or the flow rate of the second quench stream in response to a temperature measurement made in the upper section.

7. The apparatus of claim 1, further comprising at least a third quench liquid distributor.

8. The apparatus of claim 1, further comprising a reheater inlet port that is in fluid communication with the cyclone separator.

9. The apparatus of claim 8, wherein the reheater inlet port is positioned in the lower section.

10. The apparatus of claim 1, wherein the pyrolysis reactor is an entrained upflow reactor.

11. The apparatus of claim 10, further comprising an inlet to the cyclone separator that is in fluid communication with an upper portion of the pyrolysis reactor.

12. The apparatus of claim 1, further comprising: a pyrolysis product condensation section, comprising a cooler and a gas liquid separator, in fluid communication with the cyclone separator.

13. The apparatus of claim 12, wherein the pyrolysis product condensation section is in fluid communication with a solids-depleted fraction outlet of the cyclone separator.

14. The apparatus of claim 1, wherein the dense phase bed is fluidized.

15. The apparatus of claim 1, wherein the reheater temperature control system comprises at least one temperature sensor, at least one temperature transmitter, at least one temperature controller and at least one control valve.

16. The apparatus of claim 15, wherein the reheater temperature control system comprises at least two temperature sensors.

* * * * *